March 18, 1941.  A. A. LOWEKE  2,235,715

BRAKE

Filed Nov. 13, 1939

INVENTOR.
AARON A. LOWEKE
BY  C. H. Fowler
ATTORNEY.

Patented Mar. 18, 1941

2,235,715

UNITED STATES PATENT OFFICE 2,235,715

BRAKE

Aaron A. Loweke, Detroit, Mich., assignor to Hydraulic Brake Company, Detroit, Mich., a corporation of California Application November 13, 1939, Serial No. 304,233

7 Claims. (Cl. 188—79.5)

This invention relates to brakes, and more particularly to automatic adjusters for the friction elements of brakes.

An object of the invention is to provide means for automatically adjusting the friction elements of a brake to compensate for wear of the linings on the friction elements.

Another object of the invention is to provide an automatic adjuster for the friction elements of a brake controlled by the wear of the lining on the friction element and operative to adjust the element in proportion to the wear on the lining.

Another object of the invention is to provide an automatic adjuster for the friction elements of a brake operative in such a manner as to avoid mal-adjustment of the friction element.

A feature of the invention is a member frictionally clamped to a friction element and movable transversely thereon for cooperation with a drum and a retractile stop, and a retractile spring connected directly to the member.

Other objects and features of the invention will more fully appear from the following description taken in connection with the accompanying drawing forming a part of this specification, and in which—

Figure 1:
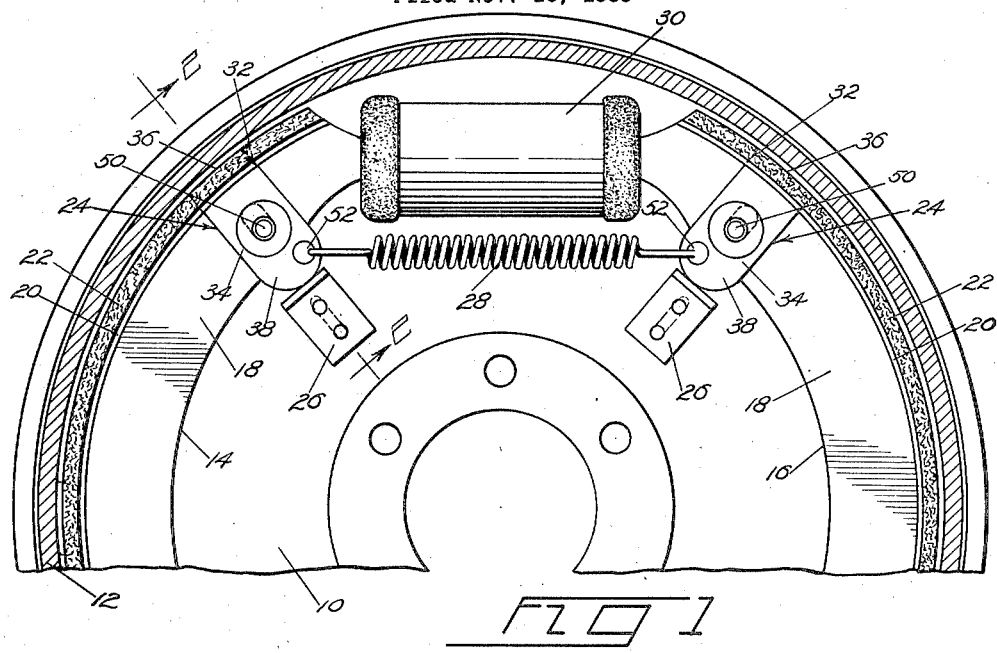
Fig. 1 is a vertical sectional view of a brake embodying the invention.
Figure 2:
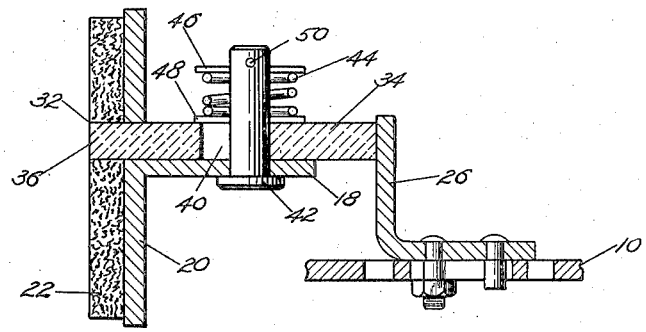
Fig. 2 is a sectional view substantially on line 2—2, Fig. 1.

Referring to the drawing for more specific details of the invention, 10 represents a fixed support or backing plate adapted to be secured to an axle or to an axle housing, and associated with the backing plate is a rotatable drum 12 adapted to be secured to a wheel.

A pair of corresponding interchangeable friction elements or shoes 14 and 16 are supported on the backing plate for cooperation with the drum. As shown, each of the shoes includes a web 18 supporting a rim 20 having secured thereon a lining 22 for frictionally engaging the drum.

Each of the shoes has mounted thereon an automatic adjuster indicated generally at 24, and adjustable retractile stops 26 are supported on the backing plate for cooperation with the adjusters to support the shoes when the brake is at rest in proper spaced relation to the drum. A retractile spring 28 connecting the adjusters 24 serves to return the shoes upon completion of a braking operation to the position of rest and to yieldingly retain them in such position, and a fluid pressure actuated motor 30 mounted on the backing plate between the separable ends of the shoes 14 and 16 is operative to actuate the shoes into engagement with the drum 12 against the resistance of the retractile spring 28.

Each of the shoes has an opening 32 extended through its rim 20 and lining 22, and a block 34, preferably of a lower coefficient of friction than the lining 22 on the shoe, is movable in the opening transversely of the shoe. As shown, the block has an arcuate end 36 adapted to engage the drum, and the other end of the block is rounded as indicated at 38 for cooperation with the associated retractile stop 26. The block has a longitudinal slot 40 for the reception of a bolt 42 mounted on the shoe. The wall defining the opening 32 through the rim and lining of the shoe and the bolt 42 serve to guide the block during movement thereof, and a spring 44 sleeved on the bolt between washers 46 and 48 and held under compression by a pin 50 passed diametrically through the bolt serves to frictionally clamp the block to the shoe.

That end of the block adapted to engage the retractile stop is provided with a transverse aperture 52 for the attachment of the retractile spring 28. It is, of course, to be understood that the load on the compression spring 44 is greater than the tensile strength of the retractile spring 28.

Figure 3:
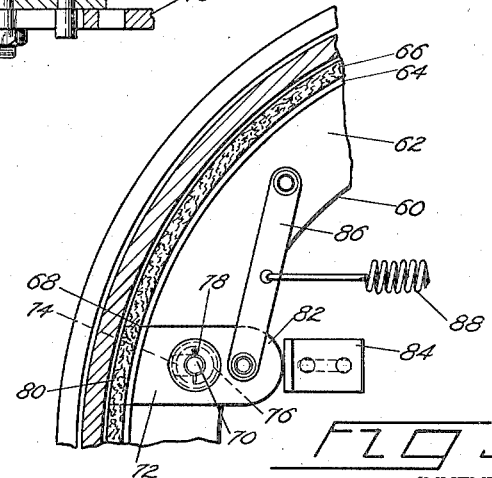
Fig. 3 is a fragmentary view illustrating a modification of the invention.

A modification of the invention is illustrated in Fig. 3. In this embodiment of the invention, a shoe 60 including a web 62 supporting a rim 64 having a lining 66 has an opening 68 through its rim and lining, and mounted in the web of the shoe is a bolt 70.

A block 72 movable transversely of the shoe in the opening 68 has a longitudinal slot 74 for the reception of the bolt 70. The block is guided during movement thereof by the wall defining the opening 68 and the bolt 70, and a spring 76 sleeved on the bolt and held under compression by a pin 78 passed transversely through the bolt serves to frictionally clamp the block 72 to the shoe. One end of the block is curved as at 80 for engagement with the drum, and the other end of the block is rounded as at 82 for cooperation with an adjustable retractile stop 84.

A link 86 has one of its ends pivoted to the block 72 adjacent the rounded end thereof. The other end of the link is pivoted to the shoe 60, and a retractile spring 88 is connected to the link. This structure has a marked advantage in that the load on the spring 76 may be greatly reduced to the end that the force required to move the block 72 against the frictional resistance imposed by the spring 76 need not be materially greater than the tensile strength of the retractile spring.

Under normal operating conditions, upon energization of the motor 30, the shoes 14 and 16 are actuated into engagement with the drum 12 against the resistance of the retractile spring 28 to effectively retard rotation of the drum. This operation results in wear of the linings 22 on the friction elements or shoes, and because of this condition, when the shoes are returned to the position of rest upon the conclusion of a braking operation, under the influence of the retractile spring 28 against the stops 26, they are not supported in proper spaced relation to the drum. Accordingly, during a subsequent braking operation greater movement of the shoes is necessitated.

In the present invention, when the shoes are actuated into engagement with the drum, the automatic adjusters 24 engage the drum simultaneously with the shoes, and because of a differential in the coefficient of friction of the linings 22 on the shoes and the blocks 34, as the lining on the shoes wears, the blocks 34 are moved relative to the shoe against the resistance imposed by the compression springs 44. This movement of the blocks is proportionate to the wear on the linings 22, and is governed entirely by the wear on the linings, hence when the shoes are returned to their retractile position on the stops 26 they are supported in proper spaced relation to the drum.

In automatic adjusters of this particular type, there is a tendency toward under-adjustment of the shoes, due to the snapping action of the retractile spring, generally connecting the shoes, occurring at the conclusion of a braking operation. To avoid this undesirable condition, the retractile spring is connected between the adjusters 24, and the compression on the spring 44 has a greater strength than the tensile strength of the retractile spring, and, furthermore, the path of movement of the block of the adjuster is angularly disposed to the force imposed by the retractile spring.

In the modified form of the invention, the retractile spring 76 is connected to the link 86 having one end pivoted to the shoe 60 and its other end pivoted to the block 72. By this arrangement the compression strength of the spring 76 may be greatly reduced to the end that but little force may be required to move the block when engaged with the drum.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A brake comprising a rotatable drum, a friction element for cooperation therewith, a retractile stop associated with the element, a member frictionally clamped to and movable transversely of the element for cooperation with the drum and stop, and a retractile spring connected to the member.

2. A brake comprising a rotatable drum, a friction element for cooperation therewith, a retractile stop for the friction element, a member frictionally clamped to the element and movable transversely thereof for cooperation with the drum and stop, and a retractile spring connected to the member imposing force at an angle to the path of movement of the member.

3. A brake comprising a rotatable drum, a friction element for cooperation therewith, a retractile stop for the element, a member frictionally clamped to and movable transversely of the element for cooperation with the drum and stop, means for guiding the member during movement thereof, and a retractile spring connected to the member imposing force at an angle to the path of movement of the member.

4. A brake comprising a rotatable drum, a friction element for cooperation therewith, an adjustable retractile stop for the element, a member frictionally clamped to and movable transversely of the element having a part for cooperation with the drum and a rounded end for cooperation with the stop, and a retractile spring connected to the member imposing force angularly disposed to the path of movement of the member.

5. A brake comprising a fixed support, a rotatable drum associated therewith, a pair of friction elements mounted on the support for cooperation with the drum, adustable retractile stops for the friction elements, adjusters for the friction elements including members frictionally clamped to and movable transversely of the friction elements for cooperation with the drum and stops, and a retractile spring connecting the members.

6. A brake comprising a rotatable drum, a friction element for cooperation therewith, a retractile stop associated with the element, a member frictionally clamped to and movable transversely of the element, linkage connecting the member to the friction element, and a retractile spring connected to the linkage.

7. A brake comprising a rotatable drum, a friction element for cooperation therewith, a retractile stop associated with the element, a member frictionally clamped to and movable transversely of the element for cooperation with the drum and stop, a link having one of its ends pivoted to the member and its other end pivoted to the element, and a retractile spring connected to the link.

AARON A. LOWEKE.